US 9,481,214 B2

(12) United States Patent
Tanno (10) Patent No.: US 9,481,214 B2
(45) Date of Patent: Nov. 1, 2016

(54) VEHICLE HUB UNIT AND AIR PRESSURE ADJUSTING DEVICE (71) Applicant: The Yokohama Rubber Co., LTD., Minato-ku, Tokyo (JP)

(72) Inventor: Atsushi Tanno, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 40 days.

(21) Appl. No.: 14/380,295

(22) PCT Filed: Feb. 13, 2013

(86) PCT No.: PCT/JP2013/053389
§ 371 (c)(1),
(2) Date: Aug. 21, 2014

(87) PCT Pub. No.: WO2013/125409
PCT Pub. Date: Aug. 29, 2013

(65) Prior Publication Data
US 2015/0013866 A1  Jan. 15, 2015

(30) Foreign Application Priority Data
Feb. 21, 2012  (JP) ................. 2012-035625

(51) Int. Cl.
*B60C 23/10* (2006.01)
*B60C 23/00* (2006.01)
(Continued)

(52) U.S. Cl.
CPC .............. *B60C 23/003* (2013.01); *B60B 1/12* (2013.01); *B60B 3/00* (2013.01); *B60B 3/02* (2013.01); *B60B 3/10* (2013.01); *B60B 19/00* (2013.01); *B60B 19/08* (2013.01); *B60B 21/00* (2013.01); *B60B 27/0047* (2013.01); *B60C 23/04* (2013.01); *B60C 23/18* (2013.01);
(Continued)

(58) Field of Classification Search
CPC ... B60C 23/12; B60C 23/003; B60C 25/135; B60C 23/10
See application file for complete search history.

(56) References Cited

U.S. PATENT DOCUMENTS 4,019,552 A * 4/1977 Tsuruta ............... B60C 11/1612
152/417
4,154,279 A * 5/1979 Tsuruta .................. B60C 23/16
152/416

(Continued)

FOREIGN PATENT DOCUMENTS

CN    102079224    6/2011
DE      674267     4/1939

(Continued)

OTHER PUBLICATIONS

International Search Report dated Apr. 16, 2013, 4 pages, Japan.

*Primary Examiner* — Hau Phan
(74) *Attorney, Agent, or Firm* — Thorpe North & Western (57) ABSTRACT A vehicle hub unit that supports a wheel that attaches to a pneumatic tire and is attached to a joint and an air pressure adjusting device that has this vehicle hub unit, provided with a first air passage that is formed with a first opening in at least one location on a surface that attaches to the wheel, is attached to pneumatic piping of the joint that supplies air, and supplies air from the first opening to the wheel; and a second air passage that is formed with a second opening in at least one location on a surface that attaches to the wheel, is attached to pneumatic piping of the joint that exhausts air of the joint, and collects air of the wheel from the second opening.

20 Claims, 9 Drawing Sheets (51) Int. Cl.
  *B60B 1/12*   (2006.01)
  *B60B 3/02*   (2006.01)
  *B60B 19/08*  (2006.01)
  *B60C 23/04*  (2006.01)
  *B60B 3/00*   (2006.01)
  *B60B 3/10*   (2006.01)
  *B60B 19/00*  (2006.01)
  *B60B 21/00*  (2006.01)
  *B60C 23/18*  (2006.01)
  *B60B 3/06*   (2006.01)
  *B60B 27/00*  (2006.01)

(52) U.S. Cl.
  CPC ................ *B60B 3/06* (2013.01); *B60B 27/00* (2013.01); *B60B 27/0005* (2013.01); *B60B 2900/325* (2013.01); *B60B 2900/351* (2013.01); *B60B 2900/551* (2013.01)

(56) References Cited

U.S. PATENT DOCUMENTS

| | | | | |
|---|---|---|---|---|
| 4,825,925 A * | 5/1989 | Schultz | ................. | B60C 23/003 |
| | | | | 152/415 |
| 4,883,106 A * | 11/1989 | Schultz | ................. | B60B 7/002 |
| | | | | 152/415 |
| 5,221,381 A * | 6/1993 | Hurrell, II | ............ | B60C 23/003 |
| | | | | 152/416 |
| 5,398,743 A * | 3/1995 | Bartos | ................. | B60C 23/003 |
| | | | | 137/225 |
| 5,553,647 A * | 9/1996 | Jaksic | ................. | B60C 23/003 |
| | | | | 152/415 |
| 5,591,281 A * | 1/1997 | Loewe | ................. | B60C 23/12 |
| | | | | 152/418 |
| 5,657,673 A * | 8/1997 | Fukamachi | ........... | B60C 25/135 |
| | | | | 157/1.17 |
| 8,113,254 B2 * | 2/2012 | Benedict | ................. | B60C 23/12 |
| | | | | 152/419 |
| 8,235,081 B2 * | 8/2012 | Delgado | ................. | B60C 23/12 |
| | | | | 152/415 |
| 8,381,785 B2 * | 2/2013 | Losey | ................. | B60C 23/12 |
| | | | | 152/415 |
| 8,474,500 B2 * | 7/2013 | Caretta | ................. | B60C 23/004 |
| | | | | 152/415 |
| 2009/0000716 A1 | 1/2009 | Isono | | |
| 2009/0084481 A1 | 4/2009 | Kalavitz | | |
| 2009/0311112 A1 | 12/2009 | Isono | | |

FOREIGN PATENT DOCUMENTS

| | | |
|---|---|---|
| DE | 1605743 | 1/1971 |
| DE | 32 06 488 | 9/1983 |
| DE | 44 08 140 | 10/1995 |
| GB | 2 178 705 | 2/1987 |
| JP | S61-169304 | 7/1986 |
| JP | 2000-255228 | 9/2000 |
| JP | 2007-176356 | 7/2007 |
| JP | 2009-056948 | 3/2009 |
| JP | 2009-179170 | 8/2009 |
| WO | WO 2007/083514 | 7/2007 |

* cited by examiner

VEHICLE HUB UNIT AND AIR PRESSURE ADJUSTING DEVICE

TECHNICAL FIELD

The present technology relates to a vehicle hub unit and an air pressure adjusting device provided with a mechanism that changes an air pressure of a pneumatic tire.

BACKGROUND

An air pressure adjusting device is a device that adjusts an air pressure of a pneumatic tire mounted on a vehicle. This air pressure adjusting device adjusts an air pressure of a pneumatic tire while a vehicle is running based on a target air pressure calculated by running conditions of the vehicle (for example, vehicle speed, running path, road surface condition, and the like). By this, fuel economy and running performance of the vehicle are improved.

Additionally, as the air pressure adjusting device, there is an air pressure adjusting system provided with an air pressure supply device described in Japanese Unexamined Patent Application Publication No. 2009-056948. The air pressure adjusting system described in Japanese Unexamined Patent Application Publication No. 2009-056948 is provided with a mechanism that supplies air to a pneumatic tire and has inside a hub unit and a wheel an air passage for introducing compressed air in the pneumatic tire.

SUMMARY

The present technology has provides a vehicle hub unit and an air pressure adjusting device that can adjust an air pressure of a pneumatic tire with high responsiveness.

The present technology is a vehicle hub unit that supports a wheel that attaches to a pneumatic tire and is attached to a joint, comprising: a first air passage that is formed with a first opening in at least one location on a surface that attaches to the wheel, is attached to pneumatic piping of the joint that supplies air, and supplies air from the first opening to the wheel; and a second air passage that is formed with a second opening in at least one location on a surface that attaches to the wheel, is attached to pneumatic piping of the joint that exhausts air, and collects air of the wheel from the second opening.

Additionally, it is preferable that a release valve that is disposed in the second air passage and exhausts air in the second air passage to the outside is further provided.

Additionally, it is preferable that a release valve that is disposed in the first air passage and exhausts air in the first air passage to the outside is further provided.

To achieve the above object, an air pressure adjusting device of the present technology has the vehicle hub unit described in any of the above and a wheel that is attached to the vehicle hub unit and supports the pneumatic tire, wherein the wheel is provided with a hub installation portion that attaches to the vehicle hub unit, a rim portion that supports the pneumatic tire, a first wheel air passage that attaches an opening attached to the first opening and an opening formed on an outer peripheral surface of the rim portion, and a second wheel air passage that attaches an opening attached to the second opening and an opening formed on the outer peripheral surface of the rim portion.

Additionally, it is preferable that the wheel has at least two spokes that attach the hub installation portion and the rim portion, the first wheel air passage is formed inside the spoke, and the second wheel air passage is formed inside the spoke.

Additionally, it is preferable that the first wheel air passage is formed inside the spoke that differs from the spoke formed with the second wheel air passage.

Additionally, it is preferable that the wheel has a disk that attaches the hub installation portion and the rim portion, the first wheel air passage is formed inside the disk, and the second wheel air passage is formed inside the disk.

Additionally, it is preferable that the wheel is provided with an air connection valve, on the hub installation portion of the first wheel air passage, that opens the first wheel air passage when the vehicle hub unit is mounted and closes the first wheel air passage when the vehicle hub unit is removed, and an air connection valve, on the hub installation portion of the second wheel air passage, that opens the second wheel air passage when the vehicle hub unit is mounted and closes the second wheel air passage when the vehicle hub unit is removed.

Additionally, it is preferable that with the wheel, there are two or more types of cross-sectional shapes of openings on rim portion sides of the first wheel air passage and the second wheel air passage.

Additionally, it is preferable that with the wheel, when flow path cross-sectional areas of the first wheel air passage and the second wheel air passage are defined as S, the flow path cross-sectional areas S are $100 \text{ mm}^2 \leq S \leq 3{,}000 \text{ mm}^2$.

Additionally, it is preferable that with the wheel, when a radial direction width of an installation surface of the hub installation portion is defined as A, the radial direction width A is $35 \text{ mm} \leq A \leq 100 \text{ mm}$.

Additionally, it is preferable that a joint is provided that attaches to a surface on which the first opening and the second opening of the vehicle hub unit are formed, and the joint is a rotational joint provided with an air passage that connects respectively to the first opening and the second opening.

Additionally, it is preferable that a pressurizing and depressurizing pump that connects to the first opening and the second opening of the vehicle hub unit, supplies air to the first opening, exhausts air from the second opening, and pressurizes and depressurizes an air pressure of the pneumatic tire mounted on the wheel; a pressure sensor that detects the air pressure of the pneumatic tire; and a control unit that drives and controls the pressurizing and depressurizing pump based on an output signal of the pressure sensor are further provided.

According to the present technology, effects are exhibited of being able to realize supplying of air to the pneumatic tire and exhausting of air from the pneumatic tire with high responsiveness and being able to adjust the air pressure of the pneumatic tire with higher responsiveness.

DETAILED DESCRIPTION

The present technology is described below in detail with reference to the accompanying drawings. However, the present technology is not limited to these embodiments. Moreover, constituents which can possibly or obviously be substituted while maintaining consistency with the present technology are included in constitutions of the embodiments. Furthermore, the multiple modified examples described in the embodiment can be combined as desired within the scope apparent to a person skilled in the art.

Air Pressure Adjusting Device

Figure 1:
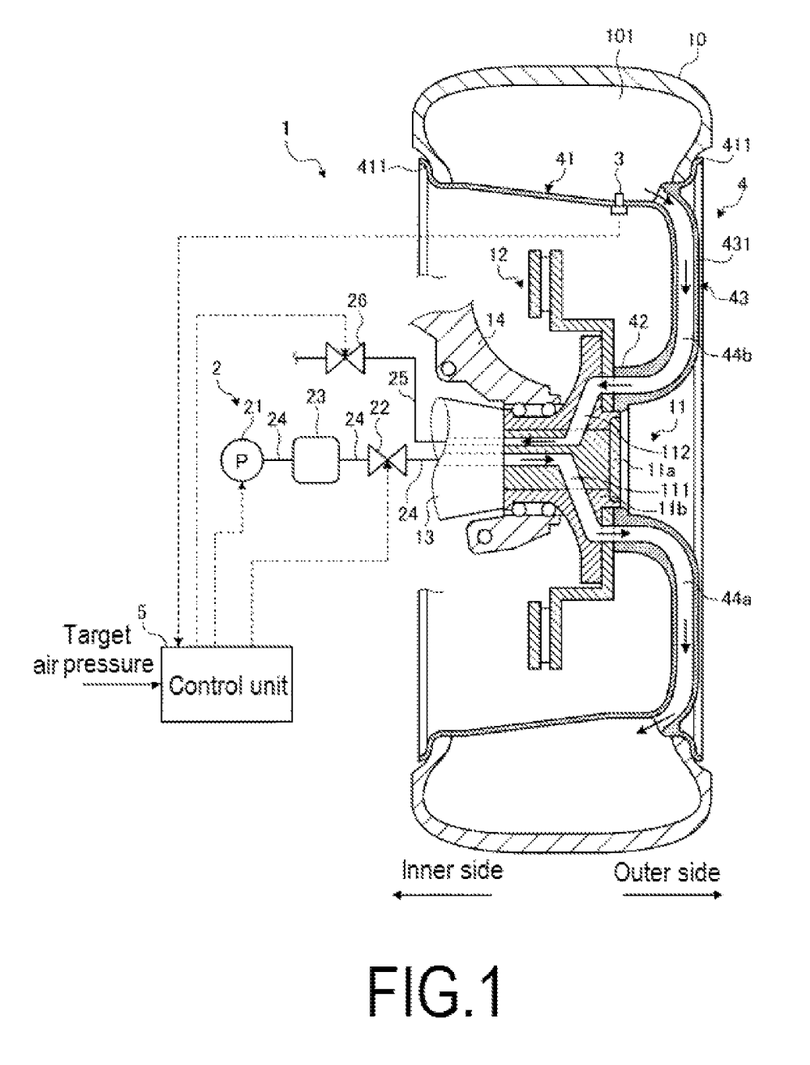
FIG. 1 is a constitution diagram illustrating a schematic constitution of an air pressure adjusting device of an embodiment of the present technology.

FIG. 1 is a constitution diagram illustrating a schematic constitution of an air pressure adjusting device of an embodiment of the present technology. FIG. 1 illustrates an air pressure adjusting device 1 equipped on a vehicle (not illustrated).

As illustrated in FIG. 1, the air pressure adjusting device 1 is a device that adjusts an air pressure of an air chamber 101 of a pneumatic tire 10 and is provided with a pressurizing and depressurizing pump 2, a pressure sensor 3, a wheel 4, a control unit 5, a hub unit 11, and a joint 13. Here, a situation where the air pressure adjusting device 1 adjusts an air pressure of the pneumatic tire 10 mounted on the vehicle will be described. Additionally, in the present case, a system that rotates together with the hub unit 11 of the vehicle, the wheel 4, and the pneumatic tire 10 while the vehicle is running will be referred to as a rotational system, and a system on a car body (not illustrated) side of the vehicle will be referred to as a stationary system. Additionally, with the air pressure adjusting device 1, the hub unit 11 and the wheel 4 connected to the pneumatic tire 10 are also provided with functions as a hub unit of the vehicle and a wheel.

With the vehicle provided with the air pressure adjusting device 1, the pneumatic tire 10 is mounted on the wheel 4. Additionally, the wheel 4 is supported by the hub unit 11. A brake rotor 12 is attached to the hub unit 11. Additionally, the joint 13 is attached to the hub unit 11. Additionally, the hub unit 11 is supported by the car body via a support mechanism 14. The joint 13 is disposed on the same rotational axis as the hub unit 11. The joint 13 contacts a surface on an opposite side of a surface of the hub unit 11 contacting the wheel 4. Additionally, with the joint 13, it is an axle joint of a rotary joint, a rotary seal, or the like, and a dual air passage is formed that can maintain a state of being attached respectively to air passages 111, 112, which are formed in the hub unit 11 and will be described below, even when the hub unit 11 is rotating. The support mechanism 14 becomes the stationary system. The support mechanism 14 is a suspension or the like and reduces a vibration transmitted while running or the like between the pneumatic tire 10, the hub unit 11, and the like and the car body.

The hub unit 11 has an inner side hub 11a disposed on a rotational center and an outer side hub 11b disposed on an outer periphery of the inner side hub 11a. Note that the inner side hub 11a and the outer side hub 11b may be integrated. With the hub unit 11, the outer side hub 11b is supported in a rotatable state by the support mechanism 14 via an axle bearing or the like. With the hub unit 11, the dual air passage of the air passage 111 and the air passage 112 is formed. With the air passage 111, it is a passage formed across the inner side hub 11a and the outer side hub 11b, a first end is attached to an air passage of the joint 13, and a second end is attached to an air passage 44a, which will be described below, of the wheel 4. With the air passage 112, it is a passage formed across the inner side hub 11a and the outer side hub 11b, a first end is attached to the air passage of the joint 13, and a second end is attached to an air passage 44b, which will be described below, of the wheel 4. With the air passages 111, 112 of this embodiment, a passage on a wheel 4 side branches into a plurality; they are connected respectively to the air passages 44a, 44b; and a passage on a joint 13 side is aggregated into one. Note that the air passages 111, 112 and pneumatic pipings 24, 25 of this embodiment may be provided in numbers that correspond to numbers of the air passages 44a, 44b.

The pressurizing and depressurizing pump 2 is a device that pressurizes and depressurizes air filled in the pneumatic tire 10. This pressurizing and depressurizing pump 2 has a pressure pump 21, a valve device 22, an air tank 23, the pneumatic piping 24, the pneumatic piping 25, and a valve device 26. The pressurizing and depressurizing pump 2 is disposed in the stationary system.

The pressure pump 21 is a pump that generates compressed air by introducing outside air and is connected to the pneumatic piping 24. The valve device 22 is disposed in the pneumatic piping 24. The valve device 22 is a valve that opens and closes the pneumatic piping 24. The air tank 23 is disposed between the pressure pump 21 of the pneumatic piping 24 and the valve device 22. The air tank 23 is a tank that stores compressed air. With the air tank 23, due to air from the pressure pump 21 being supplied, an amount of air being stored is increased, and a pressure inside rises. The air tank 23 supplies air from the pneumatic piping 24 to the air passage 111, collects air inside the air passage 111, and the like when the valve device 22 is opened. The pneumatic piping 24 is connected to the air chamber 101 of the pneumatic tire 10 via the air passage of the joint 13, the air passage 111 of the hub unit 11, and the air passage 44a of the wheel 4. The air passage 44a of the wheel 4 will be described below. The pneumatic piping 25 is connected to the air chamber 101 of the pneumatic tire 10 via the air passage of the joint 13, the air passage 112 of the hub unit 11, and the air passage 44b of the wheel 4. The air passage 44b of the wheel 4 will be described below. The valve device 26 is a valve that opens and closes the pneumatic piping 25.

With the pressurizing and depressurizing pump 2, portions of the pneumatic piping 24 and the pneumatic piping 25 may be disposed in the rotational system of the vehicle, and the pressure pump 21, the valve device 22, the valve device 26, a portion of the pneumatic piping 24, and a portion of the pneumatic piping 25 may be disposed in the stationary system. Here, a boundary between a portion of the rotational system and a portion of the stationary system of the pneumatic piping 24 and the pneumatic piping 25 may be connected via a rotary joint, as in the joint 13 and the hub unit 11 described above, or via an air universal joint. By this, the pneumatic pipings 24, 25 can maintain a connected state even when the rotational system is rotating.

Note that the pressurizing and depressurizing pump 2 is not limited to this embodiment and may dispose every mechanism in the rotational system or dispose the valve device 22 and the valve device 26 in the rotational system. Note that with the air pressure adjusting device 1 and the vehicle, when portions of the pneumatic piping 24 and the pneumatic piping 25 of the pressurizing and depressurizing pump 2 are disposed in the rotational system, the joint 13 is of a mechanism that rotates. Additionally, with the air pressure adjusting device 1 and the vehicle, when portions of the pneumatic piping 24 and the pneumatic piping 25 of the pressurizing and depressurizing pump 2 are disposed in the rotational system, a configuration may be one that does not provide the joint 13. Additionally, with the pneumatic piping 24 and the pneumatic piping 25, the air passage formed in the joint 13 may be a portion of each pneumatic piping. Here, when a corresponding wheel is a drive wheel, there is a situation where the vehicle is of a configuration that makes the joint 13 a drive shaft and integrally rotates the joint 13 with the hub unit 11. In this situation, the joint 13 is attached to a separate joint, the attaching portion is connected by a rotary joint or the like and put in a state of being connected to the pneumatic pipings.

The pressure sensor 3 is a sensor that detects the air pressure of the air chamber 101 of the pneumatic tire 10, is disposed on the wheel 4, and rotates with the wheel 4. Note that the pressure sensor 3 is favorable if able to detect the air pressure of the air chamber 101, and a disposition position is not limited thereto. The pressure sensor 3 may be provided on piping linked with the air chamber 101, such as the air passages 44a, 44b, 111, 112; the pneumatic pipings 24, 25; or the like. That is, with the air pressure adjusting device 1, it is favorable if able to detect a pressure (a pressure wherewith a pressure of the air chamber 101 can be calculated) of the air chamber 101, and the pressure sensor 3 may be disposed in the stationary system.

Wheel

Figure 2:
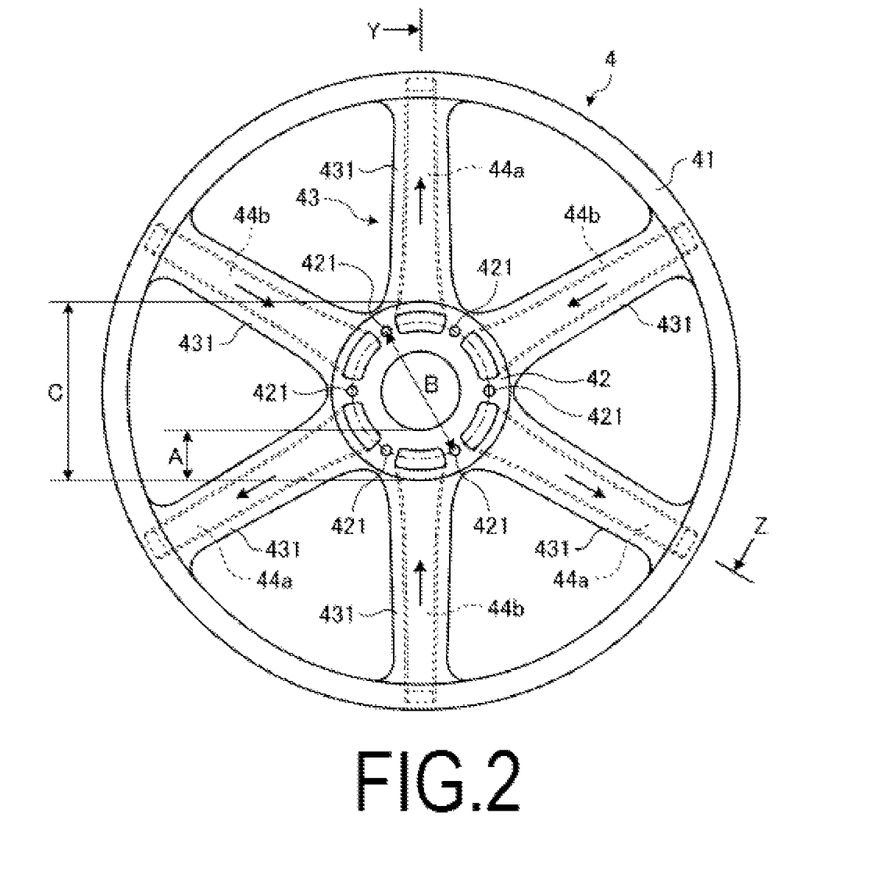
FIG. 2 is an explanatory diagram illustrating a wheel depicted in FIG. 1.
Figure 3:
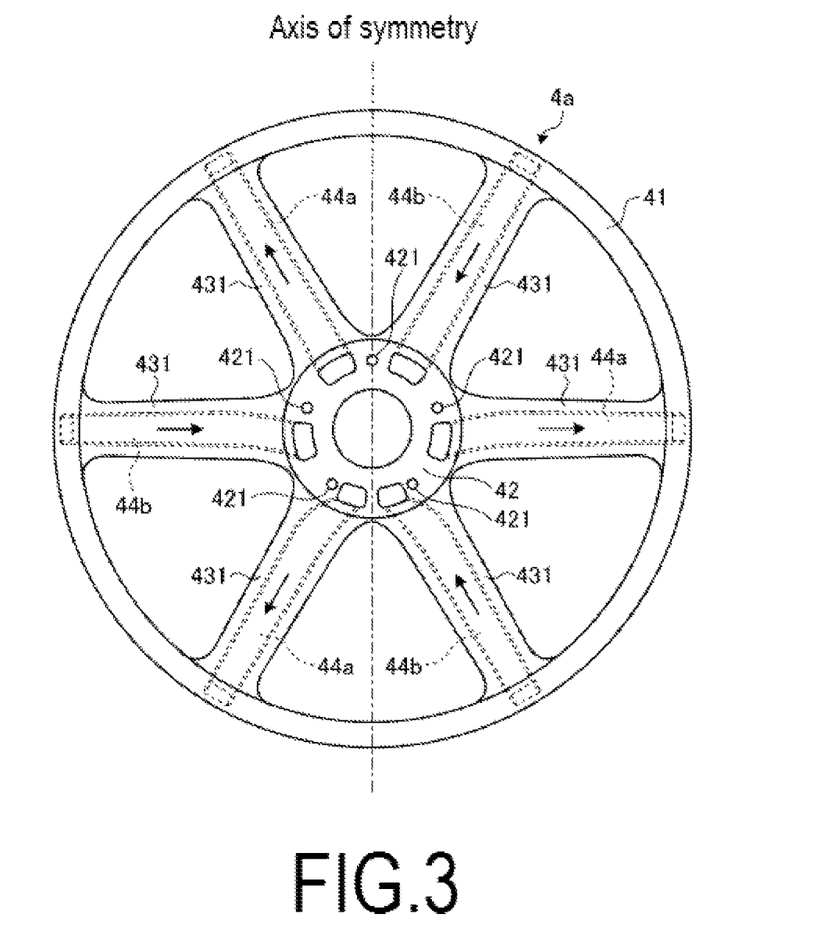
FIG. 3 is an explanatory diagram illustrating a wheel of another example.
Figure 4:
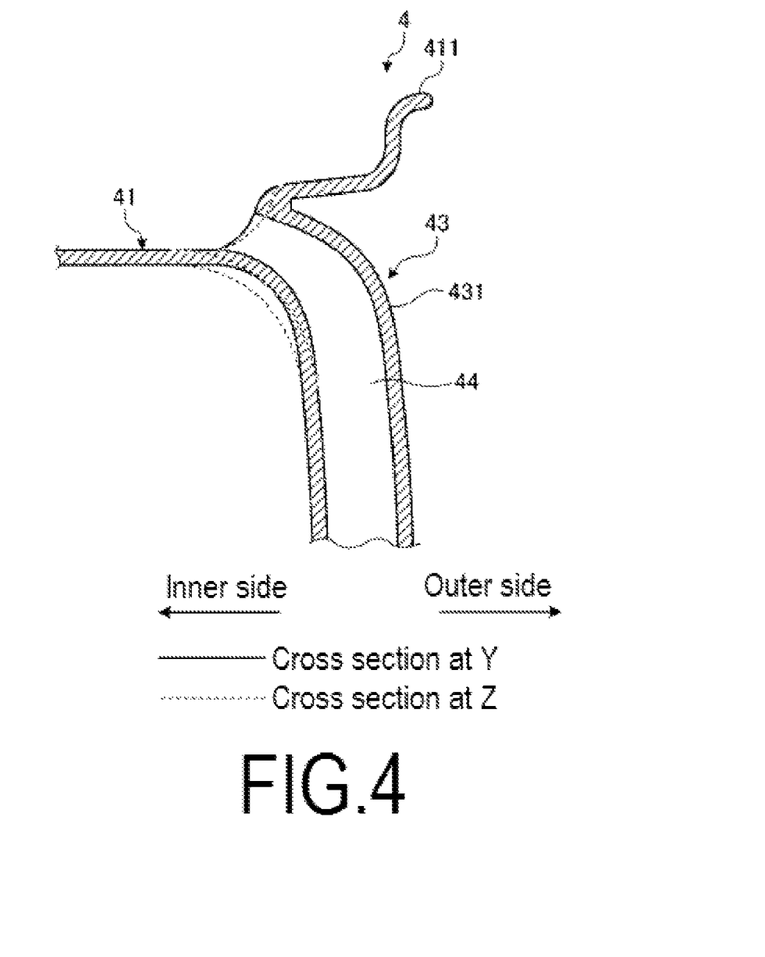
FIG. 4 is an explanatory diagram illustrating the wheel depicted in FIG. 1.

The wheel 4 is a vehicle wheel that mounts the pneumatic tire 10, is disposed on the vehicle, and is bolted and fixed to the hub unit 11 of the vehicle. FIG. 2 is an explanatory diagram illustrating a wheel depicted in FIG. 1. FIG. 3 is an explanatory diagram illustrating a wheel of another example. FIG. 4 is an explanatory diagram illustrating the wheel depicted in FIG. 1. FIG. 2 is a plan view of an inner side of the wheel 4. FIG. 3 is a modified example where a configuration of a portion of the wheel is changed.

The wheel 4 is provided with a rim portion 41, a hub installation portion 42, and an attaching portion 43 (see FIG. 2). This wheel 4 is formed from, for example, cast aluminum, forged aluminum, a resin, a complex of a resin and aluminum, or the like. In particular, when using a resin, it is preferable that the wheel 4 is formed from a resin containing reinforcing short fibers, and it is more preferable that the resin is formed from a thermosetting resin.

The rim portion 41 has an annular structure and has a flange 411 on left and right edges (see FIG. 4). The pneumatic tire 10 is mounted on the wheel 4 by fitting on this flange 411 (see FIG. 1). Additionally, in an inflated state of the pneumatic tire 10, the air chamber 101 is formed between an outer peripheral surface of the rim portion 41 and an inner peripheral surface of the pneumatic tire 10.

The hub installation portion 42 has the annular structure and constitutes a rotational axis of the wheel 4 (see FIG. 2). The wheel 4 is installed on the hub unit 11 of the vehicle with an end surface on an inner side of this hub installation portion 42 as an installation surface (see FIG. 1). Additionally, the hub installation portion 42 has a plurality of bolt holes 421 and is installed to the hub unit 11 of the vehicle via bolts inserted through these bolt holes 421.

The attaching portion 43 is a portion that attaches the rim portion 41 and the hub installation portion 42 and is constituted from, for example, a plurality of spokes 431 (see FIG. 2) or a single disk (not illustrated). When the attaching portion 43 is formed from the plurality of spokes 431, it is preferable that four or more spokes 431 are disposed. For example, in a configuration of FIG. 2, the wheel 4 is a spoke wheel, and the attaching portion 43 has six spokes 431 that extend radially.

Air Passages of Wheel

Additionally, this wheel 4 has the air passages 44a, 44b that penetrate the attaching portion 43 and open to the outer peripheral surface of the rim portion 41 and the installation surface of the hub installation portion 42 (see FIG. 2).

These air passages 44a, 44b constitute portions of air passages that connect the pressurizing and depressurizing pump 2 of the air pressure adjusting device 1 and the air chamber 101 of the pneumatic tire 10 (see FIG. 1). The air passage 44a becomes an introduction path (when the air pressure of the pneumatic tire 10 is increasing) of air from the pressurizing and depressurizing pump 2 to the air chamber 101. The air passage 44b becomes an exhaustion path (when the air pressure of the pneumatic tire 10 is decreasing) of air from the air chamber 101 to the outside.

Note that in a configuration as in this embodiment where the attaching portion 43 is formed from the plurality of spokes 431 (see FIG. 2), it is preferable to form the air passages 44a, 44b inside the spokes 431. By providing air passages 44 inside the plurality of spokes 431, a needed flow path cross-sectional area can be properly ensured. Additionally, with the air pressure adjusting device 1, when the attaching portion 43 is the disk, it is favorable to form the air passages 44a, 44b inside the disk.

In a configuration illustrated in FIG. 2, the attaching portion 43 of the wheel 4 is formed from six spokes 431, and these spokes 431 each have mutually independent air passages 44a, 44b (see FIG. 2). Specifically, each spoke 431 has the air passages 44a, 44b inside by each spoke 431 having a hollow structure. In this embodiment, the six spokes 431 have the air passage 44a and the air passage 44b in alternation. That is, with the wheel 4, three air passages 44a and three air passages 44b are formed. Additionally, each of the air passages 44a, 44b opens respectively to a base of the flange 411 on an outer side of the rim portion 41 from among the outer peripheral surface of the rim portion 41 (see FIG. 2). At this time, an orientation of an opening of each of the air passages 44a, 44b faces toward an inner side of the rim portion 41 from the outer side thereof, and an edge of an opening portion is disposed along the outer peripheral surface of the rim portion 41. By this, each air passage 44a is constituted so that air introduced in the air chamber 101 from each air passage 44a flows along the outer peripheral surface of the rim portion 41.

Additionally, the air passages 44a, 44b of each spoke 431 each open to the installation surface of the hub installation portion 42 (see FIG. 2). Additionally, the bolt holes 421 for bolting the hub installation portion 42 to the hub unit 11 of the vehicle are formed. Additionally, a number of opening portions of the air passages 44 and a number of the bolt holes 421 are the same number. Additionally, these opening portions of the air passages 44 and the bolt holes 421 are disposed alternately and at equal intervals around a rotational axis of the hub installation portion 42.

Note that with the wheel 4 illustrated in FIG. 2, the spokes 431 and the bolt holes 421 are disposed alternately and at equal intervals, but the wheel 4 is not limited thereto. For example, as illustrated in FIG. 3, the wheel 4 may be of a configuration where six spokes 431 are provided and the bolt holes 421 are provided in five locations. In this situation, it is favorable that the air passages 44a, 44b formed inside the spokes 431 provide with openings that attach to the hub unit 11 in positions shifted from the bolt holes 421. Note that with wheels 4, 4a, it is preferable that the spokes 431 are disposed at equal intervals in a rotational direction. Additionally, with the wheels 4, 4a, it is preferable to alternately dispose the air passages 44a and the air passages 44b and symmetrically dispose the air passages 44a and the air passages 44b with an axis of symmetry that passes through the rotational axis as an axis. By this, supplying of air to the air chamber 101 and exhausting of air from the air chamber 101 can be executed efficiently.

Control Unit

Description of the air pressure adjusting device 1 will be continued by returning to FIG. 1. The control unit 5 is a unit that drives and controls the pressure pump 21 of the pressurizing and depressurizing pump 2, the valve device 22, and the valve device 26 based on a signal relating to a target air pressure of the pneumatic tire 10 (for example, a signal from a vehicle electronic control unit (ECU) or from an exclusive-use air pressure control device equipped on the vehicle) and a signal from the pressure sensor 3. This control unit 5 is formed from, for example, a central processing unit (CPU), a random access memory (RAM), a read only memory (ROM), and the like. Additionally, the control unit 5 is disposed in the stationary system of the vehicle and electrically connected to the pressure pump 21, the valve device 22, the valve device 26, and the pressure sensor 3 in the rotational system, respectively. By this, signal transmission paths between the control unit 5, the pressure pump 21, the valve device 22, the valve device 26, and the pressure sensor 3 are ensured, and power supply paths from a battery (not illustrated) in the vehicle to the pressure pump 21, the valve device 22, the valve device 26, and the pressure sensor 3 are ensured.

The control unit 5 is connected to the pressure pump 21 and the valve devices 22, 26 via various wirings and connection terminals. Additionally, the control unit 5 is electrically connected to the pressure sensor 3 in the rotational system via a terminal, a plurality of sets of stationary terminals and rotational terminals, and the like. Specifically, the terminal and each stationary terminal are provided in the stationary system of the vehicle. Additionally, each stationary terminal is formed from a conductor of an annular shape and is supported by being arranged on the terminal. Additionally, the rotational terminals of the pressure sensor 3 are disposed in the rotational system of the vehicle. Additionally, each stationary terminal and each rotational terminal are connected to each other so as to be able to slide via a slip ring structure. By this, while the vehicle is running, an electrical connection between the control unit 5 in the stationary system and the pressure sensor 3 in the rotational system is ensured. Note that when the pressure pump 21 and the valve devices 22, 26 are disposed in the rotational system, the control unit 5 is electrically connected to the pressure pump 21 and the valve devices 22, 26 via the terminal, the plurality of sets of stationary terminals and rotational terminals, and the like, similar to the pressure sensor 3.

With this air pressure adjusting device 1, while the vehicle is running, the vehicle electronic control unit (ECU) or the exclusive-use air pressure control device (not illustrated) equipped on the vehicle inputs the signal relating to the target air pressure of the pneumatic tire 10 to the control unit 5. This target air pressure is suitably set according to running conditions (for example, a vehicle speed, a running path, a road surface condition, and the like) of the vehicle. Additionally, the control unit 5 drives and controls the pressure pump 21 of the pressurizing and depressurizing pump 2, the valve device 22, and the valve device 26 based on the signal relating to this target air pressure and the signal from the pressure sensor 3. By this, the air pressure of the pneumatic tire 10 is adjusted, and a running performance and a fuel economy of the vehicle are improved.

With the air pressure adjusting device 1, when, for example, increasing the air pressure of the pneumatic tire 10, the control unit 5 drives the pressure pump 21. Then, the pressure pump 21 generates compressed air, and compressed air is stored in the air tank 23. Note that with the air pressure adjusting device 1, the pressure pump 21 may be driven in advance so that the air tank 23 is in a state where compressed air is stored therein. With the air pressure adjusting device 1, the valve device 22 is opened by the control unit 5 in the state where compressed air is stored in the air tank 23. With the air pressure adjusting device 1, when the valve device 22 is opened, compressed air in the air tank 23 is supplied to the air chamber 101 of the pneumatic tire 10 via the pneumatic piping 24, the air passage 111 of the hub unit 11, and the air passage 44a of the wheel 4. Then, when an actual air pressure of the air chamber 101 becomes the target air pressure, the control unit 5 closes the valve device 22. Additionally, the air pressure adjusting device 1 stops the pressure pump 21.

With the air pressure adjusting device 1, when decreasing the air pressure of the pneumatic tire 10, the control unit 5 opens the valve device 26. Then, air of the air chamber 101 is exhausted via the air passage 44b of the wheel 4, the air passage 112 of the hub unit 11, and the pneumatic piping 25. Then, when the actual air pressure of the air chamber 101 becomes the target air pressure, the control unit 5 closes the valve device 26. In this manner, the air pressure adjusting device 1 can adjust increasing and decreasing the air pressure of the pneumatic tire 10 by controlling supplying of air to the air chamber 101 of the pneumatic tire 10 and exhausting of air of the air chamber 101 of the pneumatic tire 10 by the pressurizing and depressurizing pump 2.

Note that the air pressure adjusting device 1 may have a plurality of sets of units where the pressurizing and depressurizing pump 2, the pressure sensor 3, the wheel 4, the hub unit 11, and the joint 13 described above are put into one set. For example, when the air pressure adjusting device 1 is applied to a four-wheeled automobile, a unit formed from the pressurizing and depressurizing pump 2, the pressure sensor 3, the wheel 4, the hub unit 11, and the joint 13 is disposed respectively on each vehicle wheel. Additionally, one control unit 5 disposed on the vehicle respectively drives and controls each pressurizing and depressurizing pump 2 based on the signals from each pressure sensor 3. By this, the air pressure of the pneumatic tire 10 mounted on each vehicle wheel can be controlled simultaneously and mutually independently. Note that with the air pressure adjusting device 1, when the vehicle is a four-wheeled vehicle, one control unit 5, one pressure pump 21, and one air tank 23 may be provided while other mechanisms; the valve devices 22, 26; the pneumatic pipings 24, 25; and the like may be provided for each combination of the wheel 4 and the pneumatic tire 10. Note that portions of the pneumatic piping 24, 25, that is, pipings of portions linked with the pressure pump 21 and the air tank 23 may be held in common.

The air pressure adjusting device 1 is of a configuration as above and can adjust the air pressure of the pneumatic tire 10 with high responsiveness by supplying air from the pressurizing and depressurizing pump 2 to the air chamber 101 of the pneumatic tire 10 and exhausting air of the air chamber 101 via the air passages 44a, 44b of the wheel 4; the air passages 111, 112 of the hub unit 11; and the like. Additionally, the air pressure adjusting device 1 can make the air pressure of the pneumatic tire 10 to be an air pressure according to a running state by enabling increasing and decreasing the air pressure of the pneumatic tire 10.

The wheel 4 of the air pressure adjusting device 1 is formed by attaching the rim portion 41 and the hub installation portion 42 via the attaching portion 43 (see FIG. 2). Additionally, with the wheel 4, the pneumatic tire 10 is mounted on the rim portion 41, and the wheel 4 is installed on the hub unit 11 of the vehicle at the hub installation portion 42 (see FIG. 1). Additionally, the wheel 4 is provided with the air passages 44 that open to the outer peripheral surface of the rim portion 41 and the installation surface of the hub installation portion 42 by penetrating the attaching portion 43.

With such a configuration, when increasing the air pressure of the pneumatic tire 10, the air passage 44a of the wheel 4 becomes an introduction path of air from the outside (the pressurizing and depressurizing pump 2 of the air pressure adjusting device 1) to the air chamber 101, and when decreasing the air pressure of the pneumatic tire 10, the air passage 44b of the wheel 4 becomes an exhaustion path from the air chamber 101 to the outside (see FIG. 1). By this, because the air passages 44a, 44b that can flow in both directions are formed inside the attaching portion 43, there is an advantage that a configuration of the wheel 4 can be simplified compared to a configuration where piping for an air passage is disposed outside the wheel.

Additionally, this wheel 4a is provided with a plurality of mutually independent air passages 44a, 44b (see FIG. 3). By this, there is an advantage that a fail-safe function can be realized even when one set of the air passages 44a, 44b is blocked because air can be flowed via another set of air passages 44a, 44b.

Additionally, with the air pressure adjusting device 1, from among the air passages 44 between the air chamber 101 of the pneumatic tire 10 and the pressurizing and depressurizing pump 2, air is supplied by a combination of the air passage 44a, the air passage 111, and the pneumatic piping 24, and air is exhausted by a combination of the air passage 44b, the air passage 112, and the pneumatic piping 25. That is, with the air pressure adjusting device 1, the air pressure of the air chamber 101 is adjusted by two systems of a piping system that supplies air and a piping system that exhausts air. By this, supplying and exhausting of air can be executed with high responsiveness, and the air pressure can be controlled with high responsiveness.

With the air pressure adjusting device 1, by executing the piping systems by the two systems of a supply system and an exhaust system, supplying and exhausting of air can be executed simultaneously. By this, with the air pressure adjusting device 1, even when the air pressure of the pneumatic tire 10 is made to be constant, air in the pneumatic tire 10 can be circulated. In this manner, by circulating air in the pneumatic tire 10, heat generated due to a rolling motion of the tire can be collected on a car body side and temperature escalation in the air chamber 101 of the pneumatic tire 10 can be suppressed. That is, the air pressure adjusting device 1 can also be used as a cooling mechanism of the pneumatic tire 10. By this, temperature escalation of the tire itself can be suppressed, and tire performance reduction can be suppressed.

Additionally, with the air pressure adjusting device 1, the attaching portion 43 of the wheel 4 has the spoke 431, and the air passages 44 are provided inside this spoke 431. By this, there is an advantage that the air passages 44 can be formed without impairing an appearance of the wheel 4.

Additionally, with the air pressure adjusting device 1, the attaching portion 43 of the wheel 4 has the disk, and the air passages 44 are provided inside the disk. By this, there is an advantage that the air passages 44 can be formed without impairing the appearance of the wheel 4.

Additionally, with the wheel 4, the hub installation portion 42 has the plurality of bolt holes 421, and it is installed on the hub unit 11 of the vehicle via the bolts inserted through the bolt holes 421 (see FIG. 1). Additionally, the attaching portion 43 has a plurality of air passages 44. Additionally, on the installation surface of the hub installation portion 42, the opening portions of the air passages 44 and the bolt holes 421 are alternately disposed around the rotational axis of the hub installation portion 42. With such a configuration, because the bolt holes 421 and the opening portions of the air passages 44 are alternately disposed around the rotational axis of the hub installation portion 42, there are advantages that a rigidity of the hub installation portion 42 is properly ensured and a bolt fastening operation of the hub installation portion 42 becomes easy.

With the air pressure adjusting device 1, air supplied to the pneumatic tire 10 can be other than air from the atmosphere. In this situation, as air supplied to the pneumatic tire 10, that is, air to be filled in the pneumatic tire 10, helium, which has high thermal conductivity; heliox, which is a mixture gas of helium and oxygen; or trimix, which is a mixture gas of helium, oxygen, and nitrogen; may be used. By using a gas with high thermal conductivity, a performance as a cooling mechanism can be heightened. Additionally, the air pressure adjusting device 1 can be made to be a mechanism that collects air exhausted from the pneumatic piping 25 and circulates air. By this, even in a situation where air of a composition other than that of the atmosphere is used, a number of replenishments can be reduced.

FIG. 4 is an explanatory diagram illustrating the wheel 4 depicted in FIG. 1. This drawing illustrates a cross-sectional view at Y (solid line portion) and a cross-sectional view at Z (dashed line portion) of an opening portion on a rim portion 41 side of the air passages 44 of the wheel 4 depicted in FIG. 2.

As described above, in the configuration of FIG. 2, the air passages 44a, 44b have the plurality of opening portions on the outer peripheral surface of the rim portion 41. At this time, it is preferable that the opening portions of each air passage 44 have mutually differing cross-sectional shapes. By this, a frequency of an air column resonance due to a disposition of the air passages 44 is dispersed, and a noise level is reduced.

For example, in a configuration of FIG. 4, the opening portions of each air passage 44 have mutually differing opening cross-sectional areas and tube lengths and are disposed with mutually differing opening directions thereof. At this time, a wall surface shape on an outer side of the wheel 4 does not change, but by changing an inside shape of the rim portion 41 and a wall surface shape on an inner side of the attaching portion 43, the opening portions of each air passage 44 have mutually differing cross-sectional shapes. Meanwhile, by a minimum value of a flow path cross-sectional area of each air passage 44 being set to be constant, flow rates of each air passage 44 are set to be the same.

In this manner, by the air passages 44 having the plurality of opening portions on the outer peripheral surface of the rim portion 41 and these opening portions having the mutually differing cross-sectional shapes, there is an advantage that the frequency of the air column resonance due to the disposition of the air passages 44 is dispersed and the noise level is reduced.

Additionally, flow path cross-sectional areas S of the air passages 44 are preferably in a range of 100 mm²≤S≤3,000 mm². Specifically, a flow path cross-sectional area when the valve device 22 of the pressurizing and depressurizing pump 2 is opened; flow path cross-sectional areas of the air passages 111 and 112 formed in the hub unit 11; and the flow path cross-sectional areas S of the air passages 44a, 44b are preferably in the range of 100 mm² or more and 3,000 mm² or less, respectively. Additionally, these flow path cross-sectional areas are preferably in a range of 120 mm² or more and 2,500 mm² or less, and more preferably in a range of 150 mm² or more and 2,000 mm² or less. By this, the flow path cross-sectional area S of each air passage 44 is made appropriate. That is, by defining 100 mm²≤S, a supply amount of air to the pneumatic tire 10 and an exhaust amount of air from the pneumatic tire 10 are properly ensured; therefore, there is an advantage that air pressure control of the pneumatic tire 10 can be performed rapidly. Additionally, by defining S≤3,000 mm², there is an advantage of being able to prevent the wheel 4 from becoming large.

Additionally, in the configuration described above, a radial direction width A of the installation surface of the hub installation portion 42 is preferably in a range of 35 mm≤A≤100 mm (see FIG. 2). Additionally, the radial direction width A is more preferably in a range of 37 mm≤A≤90 mm, and still more preferably in a range of 40 mm≤A≤80 mm. By this, there is an advantage that the radial direction width A of the installation surface of the hub installation portion 42 is made appropriate.

Additionally, a pitch diameter B of the bolt holes 421 on the installation surface of the hub installation portion 42 is preferably in a range of 100 mm≤B≤280 mm (see FIG. 2). Additionally, the pitch diameter B is more preferably in a range of 110 mm≤B≤260 mm, and the pitch diameter B is still more preferably in a range of 115 mm≤B≤240 mm.

Additionally, a diameter C of the installation surface of the hub installation portion 42 is preferably in a range of 140 mm≤C≤300 mm (see FIG. 2). Additionally, the diameter C is more preferably in a range of 145 mm≤C≤280 mm, and the diameter C is still more preferably in a range of 150 mm≤C≤260 mm.

These dimensions A to C are generally regulated by a relationship between the hub installation portion 42 and the hub unit 11 of the vehicle. By these dimensions A to C being in the ranges described above, disposition regions of the opening portions of the air passages 44 and the bolt holes 421 on the installation surface of the hub installation portion 42 are properly ensured. Additionally, the relationship between the hub installation portion 42 and the hub unit 11 of the vehicle can be made appropriate.

Release Valve of Hub Unit

Figure 5:
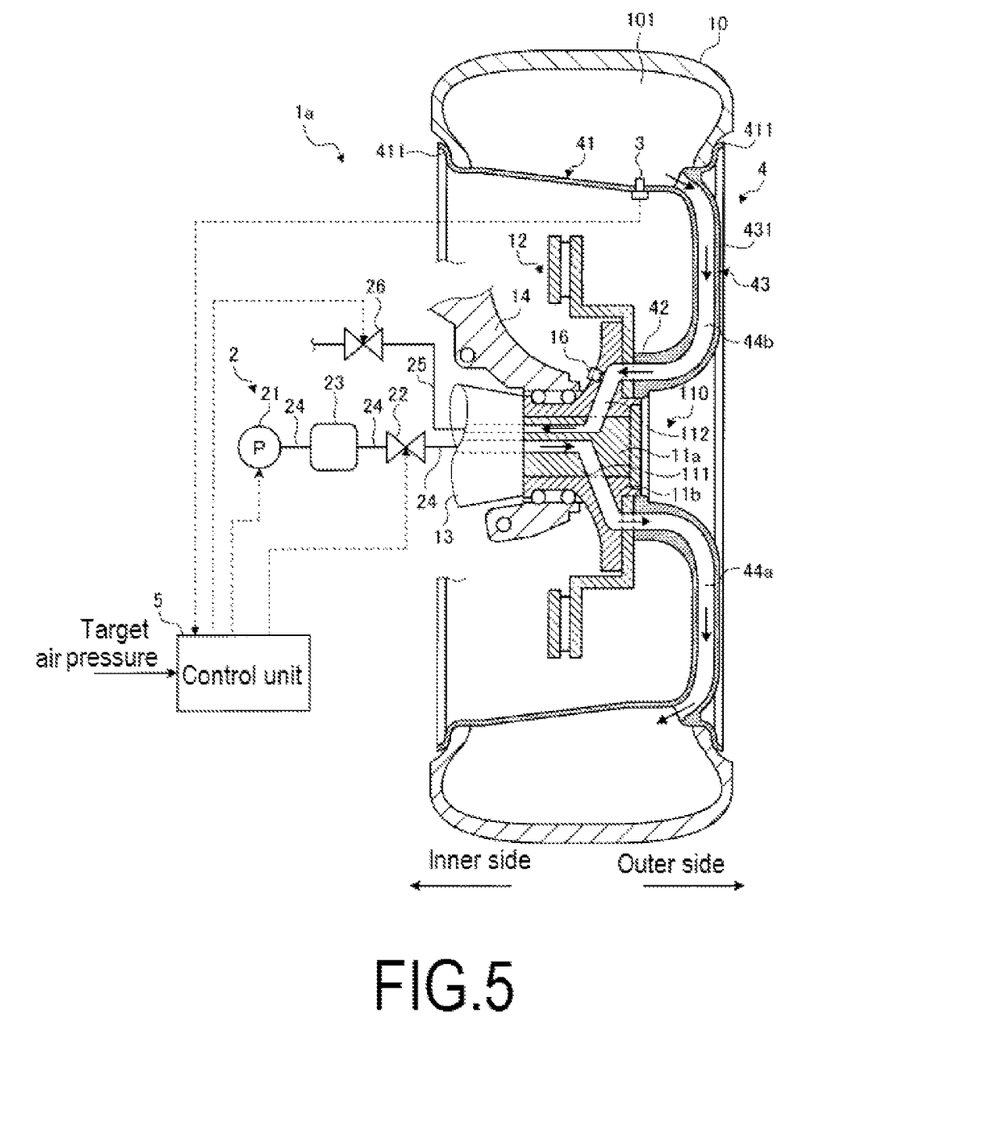
FIG. 5 is a constitution diagram illustrating a schematic constitution of an air pressure adjusting device of another embodiment.

FIG. 5 is a constitution diagram illustrating a schematic constitution of an air pressure adjusting device of another embodiment. An air pressure adjusting device 1a illustrated in FIG. 5 is of the same configuration as the air pressure adjusting device 1 besides being provided with a release valve 16 on a hub unit 110. The release valve 16, which is a configuration unique to the air pressure adjusting device 1a, will be described below.

The release valve 16 is formed in a position linked with the air passage 112 of the hub unit 110. The release valve 16, by being opened, exhausts air of the air passage 112 to the outside. The air pressure adjusting device 1a illustrated in FIG. 5 can exhaust air of the air passage 112 to the outside and exhaust air in the air chamber 101 by opening the release valve 16. The release valve 16 may be provided in one location in the air passage 112 or in a plurality of locations, for example, at each position corresponding to the air passage 44b.

The air pressure adjusting device 1a, by exhausting air in the air chamber 101 by the release valve 16 provided in the air passage 112 of the hub unit 110, can exhaust air in the air chamber 101 with higher responsiveness. Specifically, with the release valve 16, because the air passage 112 can be opened to the atmosphere at a position near the air chamber 101, responsiveness can be heightened.

Air Connection Valve of Wheel

Figure 6:
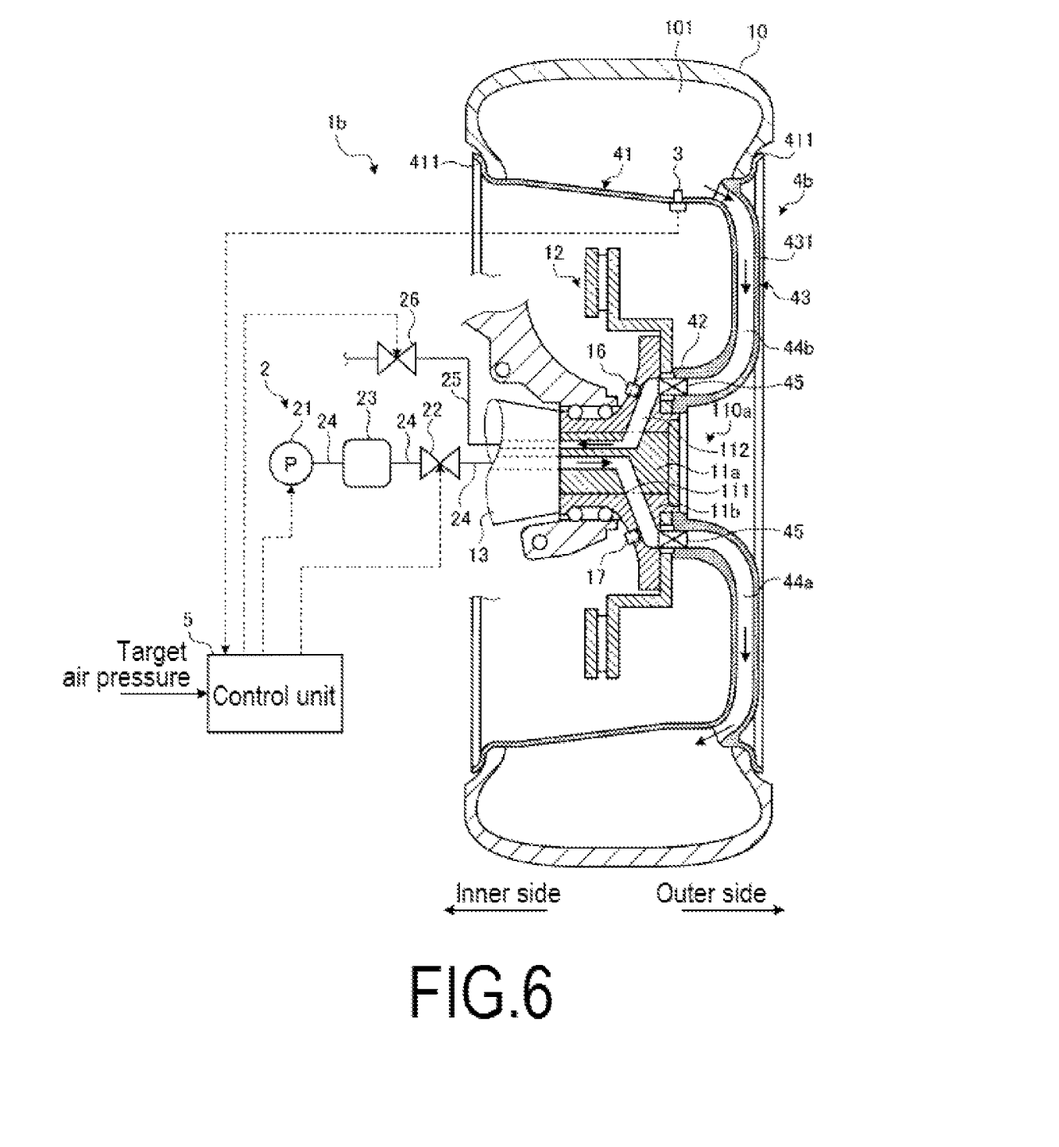
FIG. 6 is a constitution diagram illustrating a schematic constitution of an air pressure adjusting device of another embodiment.
Figure 7:
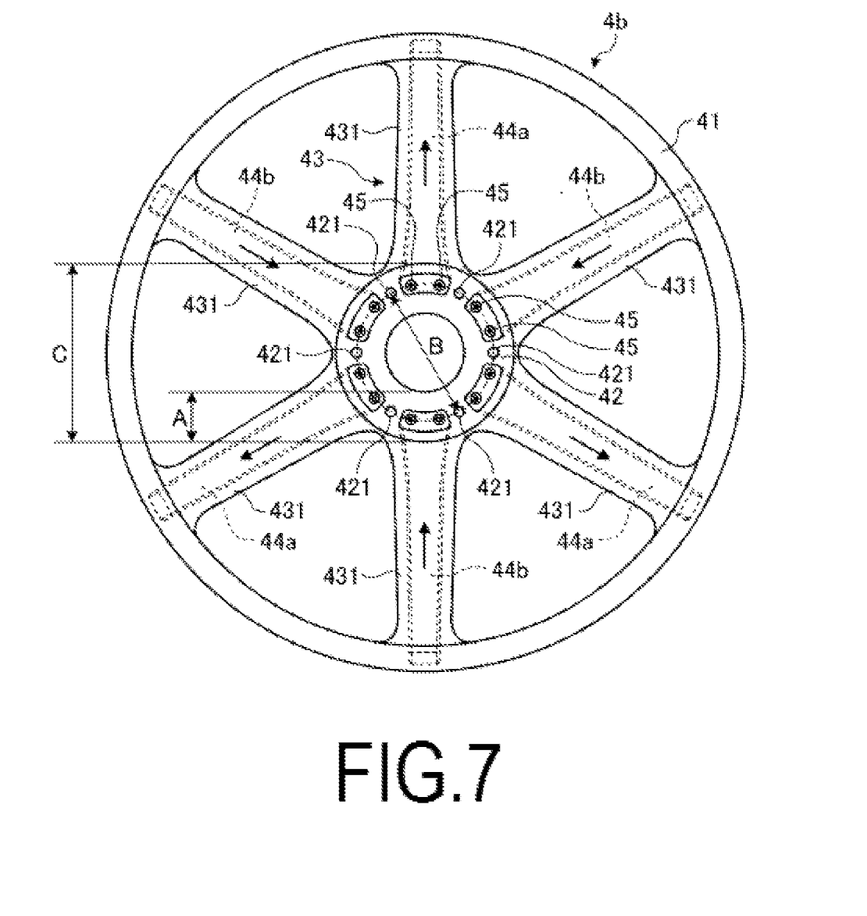
FIG. 7 is an explanatory diagram illustrating a wheel depicted in FIG. 6.
Figure 8:
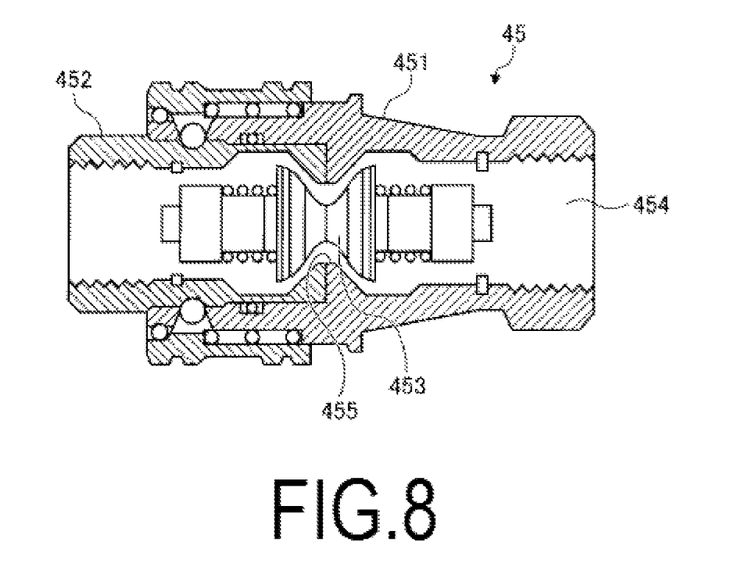
FIG. 8 is an axial direction cross-sectional view illustrating an air connection valve of the wheel depicted in FIG. 6.

FIG. 6 is a constitution diagram illustrating a schematic constitution of an air pressure adjusting device of another embodiment. FIG. 7 is an explanatory diagram illustrating a wheel depicted in FIG. 6. FIG. 8 is an axial direction cross-sectional view illustrating an air connection valve of the wheel depicted in FIG. 6. An air pressure adjusting device 1b illustrated in FIG. 6 is provided with release valves 16, 17 in a hub unit 110a and is of the same configuration as the air pressure adjusting device 1 besides being provided with an air connection valve 45 in a wheel 4b. The release valves 16, 17 and the air connection valve 45, which are constitutions unique to the air pressure adjusting device 1b, will be described below. The release valve 16 is of the same configuration as the release valve 16 of the air pressure adjusting device 1a.

The release valve 17 is formed in a position linked with the air passage 111 of the hub unit 110a. The release valve 17, by being opened, exhausts air of the air passage 111 to the outside. The air pressure adjusting device 1b illustrated in FIG. 6 can exhaust air of the air passage 111 to the outside and exhaust air in the air chamber 101 by opening the release valve 17. The release valve 17 may be provided in one location in the air passage 111 or in a plurality of locations, for example, at each position corresponding to the air passage 44a.

The air pressure adjusting device 1b can exhaust air in the air chamber 101 with higher responsiveness even by exhausting air in the air chamber 101 by the release valve 17 provided in the air passage 111 of the hub unit 110a in addition to or in place of the release valve 16 provided in the air passage 112 of the hub unit 110a.

The air connection valve (air coupler) 45 is disposed in an opening portion on a hub installation portion 42 side of each of the air passages 44a, 44b of the wheel 4b. FIG. 8 is the axial direction cross-sectional view illustrating the air connection valve of the wheel depicted in FIG. 6. This drawing illustrates a state where the air connection valve 45 is opened.

As illustrated in FIG. 8, the air connection valve 45 has a plug portion 451, a socket portion 452, and a valve body 453. The plug portion 451 and the socket portion 452 have short tubular structures. Additionally, the plug portion 451 is inserted so as to be displaceable back and forth in the socket portion 452 and can elastically displace in an axial direction via a coil spring. Additionally, inside the air connection valve 45, an air passage 454 is formed by the tubular structures of the plug portion 451 and the socket portion 452. In this air passage 454, a reduced diameter portion 455 formed by reducing inside diameters of the plug portion 451 and the socket portion 452 is formed. The valve body 453 is a valve body that opens and closes this air passage 454, is interposed in both the plug portion 451 and the socket portion 452, and can displace back and forth in the axial direction. This valve body 453 seals the air passage 454 by fitting with the reduced diameter portion 455 in the air passage 454 (not illustrated). Additionally, the valve body 453 opens the air passage 454 by separating from the reduced diameter portion 455 (see FIG. 8). This air connection valve 45 is fixed by fitting the plug portion 451 (or the socket portion 452) into the opening portion on the hub installation portion 42 side of the air passages 44 and is disposed by protruding the socket portion 452 (or the plug portion 451) from the installation surface of the hub installation portion 42.

With this air connection valve 45, in a state where the wheel 4b is installed on the hub unit 110a of the vehicle (see FIG. 6), the plug portion 451 is pushed into the socket portion 452 by the plug portion 451 being pressed by the hub unit 110a (see FIG. 8). In this state, the valve body 453 separates from the reduced diameter portion 455, and the air connection valve 45 is opened. Then, the opening portion on the hub installation portion 42 side of the air passages 44 of the wheel 4b is opened, and the air passages 44a, 44b are communicated. By this, supplying compressed air from the pressurizing and depressurizing pump 2 to the air chamber 101 of the pneumatic tire 10 or exhausting air from the air chamber 101 to the outside becomes possible.

Meanwhile, in a state where the wheel 4b is removed from the hub unit 110a of the vehicle, the plug portion 451 is pushed out from the socket portion 452 and displaces in the axial direction, and the valve body 453 biases to the reduced diameter portion 455 of the plug portion 451 and the socket portion 452. In this state, the valve body 453 fits with the reduced diameter portion 455, and the air connection valve 45 is closed. Then, the opening portion on the hub installation portion 42 side of the air passages 44 is sealed, and the air passages 44 are blocked. By this, when, for example, inflating and mounting on the vehicle the pneumatic tire 10, an assembly of the pneumatic tire 10 and the wheel 4b can be transported while the pneumatic tire 10 is filled with air.

Note that with a configuration of FIG. 6, the six spokes 431 of the wheel 4b each have mutually independent air passages 44, and the air connection valve 45 is disposed in each opening portion on the hub installation portion 42 side of each of the air passages 44. Additionally, as illustrated in FIG. 7, with the air pressure adjusting device 1b, two air connection valves 45 are disposed in one opening portion of the air passages 44a, 44b. By this, the flow path cross-sectional areas of the air passages 44a, 44b are ensured while ensuring a function of the air connection valve 45.

The air pressure adjusting device 1b opens the air passages 44 when the wheel 4b is mounted on the vehicle and is provided with the air connection valve (air coupler) 45 that closes the air passages 44 when the wheel 4b stands alone. With such a configuration, in a state where the wheel 4b is installed on the hub unit 110a of the vehicle, there are advantages that the air passages 44 are communicated and supplying compressed air from the pressurizing and depressurizing pump 2 to the air chamber 101 of the pneumatic tire 10 is enabled or that exhausting air from the air chamber 101 to the outside is enabled. Meanwhile, in a state where the wheel 4b is removed from the hub unit 110a of the vehicle, because the air passages 44 are blocked, when, for example, inflating and mounting on the vehicle the pneumatic tire 10, there is an advantage that the assembly of the pneumatic tire 10 and the wheel 4b can be transported while the pneumatic tire 10 is filled with air.

In-Wheel Motor Unit

Figure 9:
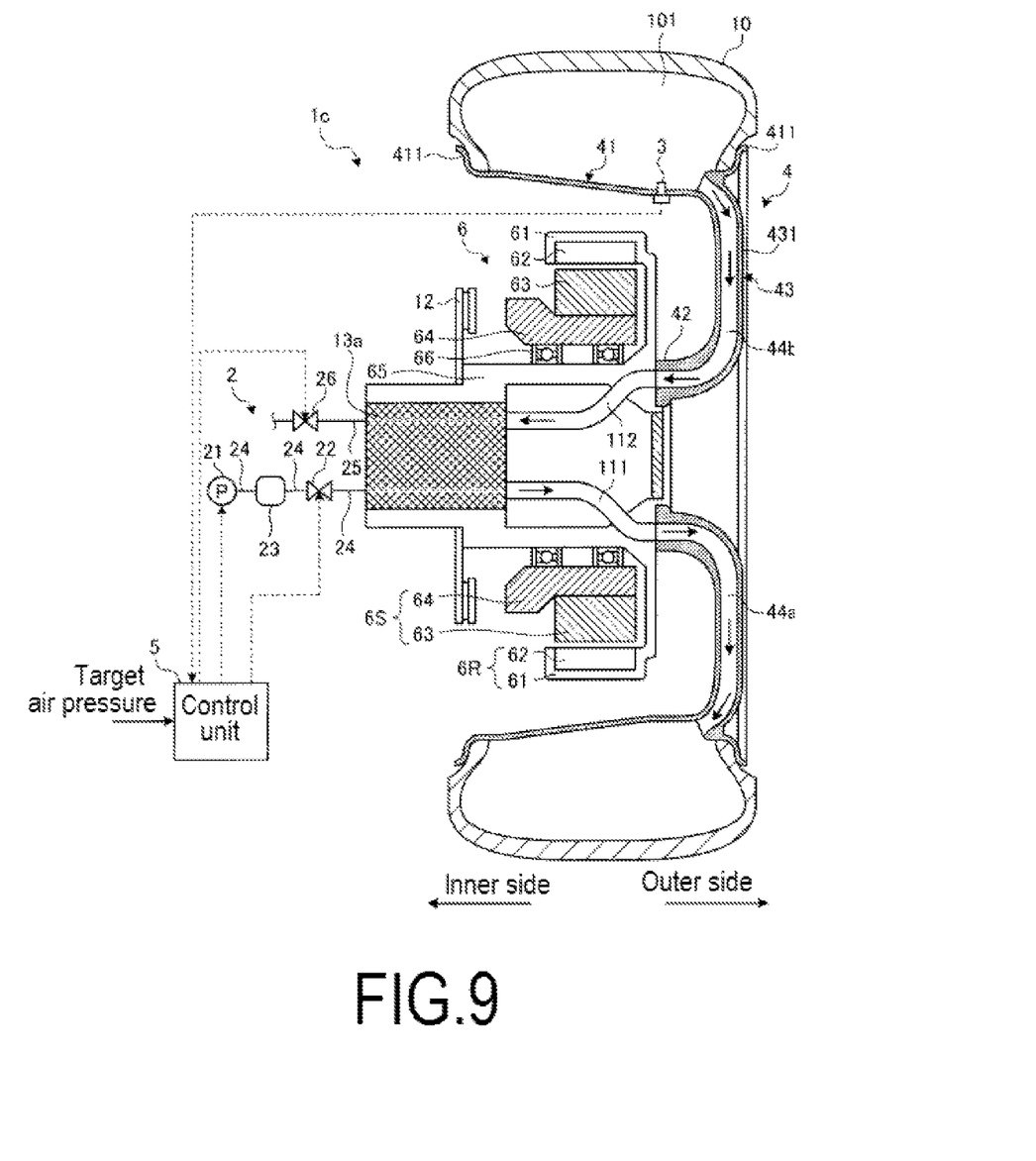
FIG. 9 is a constitution diagram illustrating a schematic constitution of an air pressure adjusting device of another embodiment.

FIG. 9 is a constitution diagram illustrating a schematic constitution of an air pressure adjusting device of another embodiment. FIG. 9 is an embodiment where the air pressure adjusting device is applied to a pneumatic tire driven by an in-wheel motor unit. An air pressure adjusting device 1c is of the same configuration as the air pressure adjusting device 1 besides a vehicle hub unit being integrated with the in-wheel motor unit.

The air pressure adjusting device 1c is a device that adjusts the air pressure of the air chamber 101 of the pneumatic tire 10 and is provided with the pressurizing and depressurizing pump 2, the pressure sensor 3, the wheel 4, the control unit 5, an in-wheel motor unit 6, and a joint 13a. The pressurizing and depressurizing pump 2, the pressure sensor 3, the wheel 4, the control unit 5, and the joint 13a are of constitutions similar to each portion of the air pressure adjusting device 1. The in-wheel motor unit 6 will be described below. Here, the in-wheel motor unit 6 is also provided with a function of the hub unit 11 of the air pressure adjusting device 1. That is, the in-wheel motor unit 6 is a drive source that rotates the wheel 4 and the pneumatic tire 10 and is the hub unit 11.

The in-wheel motor unit 6 is an electric motor of an outer rotor type where a rotor 6R is disposed on an outer side of a stator 6S. The in-wheel motor unit 6 is used in a so-called in-wheel motor system installed on a suspension device of the vehicle. The rotor 6R includes a rotor case 61 having an annular structure and permanent magnets 22 that are installed on the inner circumference of the rotor case 61. The permanent magnets 62 are alternatingly disposed with the S pole and the N pole facing the circumferential direction of the rotor case 61. A shaft 65 is installed in the center portion of the rotor case 61.

The stator 6S is disposed on the inner side of the permanent magnets 62 that belong to the rotor 6R. The stator 6S has a plurality of coils 63 provided on a periphery of a stator main body 64. The stator main body 64 has an axle bearing 66 in the center portion. The shaft 65 described above is supported by the stator main body 64 via the axle bearing 66. By such a structure, the rotor 6R is enabled to rotate around the stator main body 64 with a rotational axis as a center. In this embodiment, the wheel 4 is installed on the shaft 65 of the rotor 6R.

Additionally, the shaft 65 is attached to the joint 13a, similar to the hub unit 11. Similar to the hub unit 11, the air passages 111, 112 are formed inside the shaft 65. The air passage 111 is attached to the air passage 44a and the pneumatic piping 24. The air passage 112 is attached to the air passage 44b and the pneumatic piping 25.

In this manner, with the air pressure adjusting device 1c, even in a configuration where the wheel 4 and the pneumatic tire 10 are mounted on the in-wheel motor unit 6, by similarly providing the air passages 111, 112 inside the shaft 65 of the in-wheel motor unit 6, effects similar to those of the above embodiments can be obtained.

With the air pressure adjusting device 1c, by making the in-wheel motor unit 6 the outer rotor type where the rotor 6R is disposed on an outer peripheral side, a region can be provided on a rotational axis center side where a drive mechanism (the rotor 6R, the stator 6S, or a reduction mechanism) of the in-wheel motor unit 6 is not disposed. By this, the air passages 111, 112 can be suitably disposed on the rotational axis center side.

What is claimed is:

1. A vehicle hub unit that supports a wheel that attaches to a pneumatic tire and is attached to a joint, comprising:
   an air supply passage that is formed with a first opening in at least one location on a surface that attaches to the wheel, is attached to pneumatic piping of the joint that supplies air, and supplies air from the first opening to the wheel; and
   an air recovery passage that is formed with a second opening in at least one location on a surface that attaches to the wheel, is attached to pneumatic piping of the joint that exhausts air, and recovers air of the wheel from the second opening.

2. The vehicle hub unit according to claim 1, further comprising: a release valve that is disposed in the second air passage and exhausts air in the second air passage to the outside.

3. The vehicle hub unit according to claim 2, further comprising: a release valve that is disposed in the first air passage and exhausts air in the first air passage to the outside.

4. An air pressure adjusting device, comprising: the vehicle hub unit described in claim 3; and
   a wheel that is attached to the vehicle hub unit and supports the pneumatic tire,
   the wheel including a hub installation portion that attaches to the vehicle hub unit, a rim portion that supports the pneumatic tire, a first wheel air passage that attaches an opening attached to the first opening and an opening formed on an outer peripheral surface of the rim portion, and a second wheel air passage that attaches an opening attached to the second opening and an opening formed on the outer peripheral surface of the rim portion.

5. The vehicle hub unit according to claim 1, further comprising:
   a release valve that is disposed in the first air passage and exhausts air in the first air passage to the outside.

6. An air pressure adjusting device, comprising: the vehicle hub unit described in claim 1; and
   the wheel that is attached to the vehicle hub unit and supports the pneumatic tire,
   the wheel including a hub installation portion that attaches to the vehicle hub unit, a rim portion that supports the pneumatic tire, a first wheel air passage that connects the first opening with a third opening formed on an outer peripheral surface of the rim portion, and a second wheel air passage that connects the second opening with a fourth opening formed on the outer peripheral surface of the rim portion.

7. The air pressure adjusting device according to claim 6, wherein the wheel has at least two spokes that attach the hub installation portion and the rim portion,
   the first wheel air passage is formed inside the spoke, and the second wheel air passage is formed inside the spoke.

8. The air pressure adjusting device according to claim 7, wherein the first wheel air passage is formed inside the spoke that differs from the spoke formed with the second wheel air passage.

9. The air pressure adjusting device according to claim 7, wherein the wheel includes an air connection valve, on the hub installation portion of the first wheel air passage, that opens the first wheel air passage when the vehicle hub unit is mounted and closes the first wheel air passage when the vehicle hub unit is removed, and
   an air connection valve, on the hub installation portion of the second wheel air passage, that opens the second wheel air passage when the vehicle hub unit is mounted and closes the second wheel air passage when the vehicle hub unit is removed.

10. The air pressure adjusting device according to claim 9, wherein with the wheel, there are two or more types of cross-sectional shapes of the openings on rim portion sides of the first wheel air passage and the second wheel air passage.

11. The air pressure adjusting device according to claim 10, wherein with the wheel, when flow path cross-sectional areas of the first wheel air passage and the second wheel air passage are defined as S, the flow path cross-sectional areas S are 100 mm$^2$≤S≤3,000 mm$^2$.

12. The air pressure adjusting device according to claim 11, wherein with the wheel, when a radial direction width of an installation surface of the hub installation portion is defined as A, the radial direction width A is 35 mm≤A≤100 mm.

13. The air pressure adjusting device according to claim 12, comprising a joint that attaches to a surface on which the first opening and the second opening of the vehicle hub unit are formed, wherein
   the joint is a rotational joint provided with an air passage that connects respectively to the first opening and the second opening.

14. The air pressure adjusting device according to claim 6, wherein the wheel has a disk that attaches the hub installation portion and the rim portion, the first wheel air passage is formed inside the disk, and the second wheel air passage is formed inside the disk.

15. The air pressure adjusting device according to claim 6, wherein the wheel includes an air connection valve, on the hub installation portion of the first wheel air passage, that opens the first wheel air passage when the vehicle hub unit is mounted and closes the first wheel air passage when the vehicle hub unit is removed, and
   an air connection valve, on the hub installation portion of the second wheel air passage, that opens the second wheel air passage when the vehicle hub unit is mounted and closes the second wheel air passage when the vehicle hub unit is removed.

16. The air pressure adjusting device according to claim 6, wherein with the wheel, there are two or more types of cross-sectional shapes of the openings on rim portion sides of the first wheel air passage and the second wheel air passage.

17. The air pressure adjusting device according to claim 6, wherein with the wheel, when flow path cross-sectional areas of the first wheel air passage and the second wheel air passage are defined as S, the flow path cross-sectional areas S are 100 mm$^2$≤S≤3,000 mm$^2$.

18. The air pressure adjusting device according to claim 6, wherein with the wheel, when a radial direction width of an installation surface of the hub installation portion is defined as A, the radial direction width A is 35 mm≤A≤100 mm.

19. The air pressure adjusting device according to claim 6, comprising a joint that attaches to a surface on which the first opening and the second opening of the vehicle hub unit are formed, wherein
   the joint is a rotational joint provided with an air passage that connects respectively to the first opening and the second opening.

20. The air pressure adjusting device according to claim 6, further comprising:
- a pressurizing and depressurizing pump that connects to the first opening and the second opening of the vehicle hub unit, supplies air to the first opening, exhausts air from the second opening, and pressurizes and depressurizes an air pressure of the pneumatic tire mounted on the wheel;
- a pressure sensor that detects the air pressure of the pneumatic tire; and
- a control unit that drives and controls the pressurizing and depressurizing pump based on an output signal of the pressure sensor.

* * * * *